Patented Aug. 20, 1929.

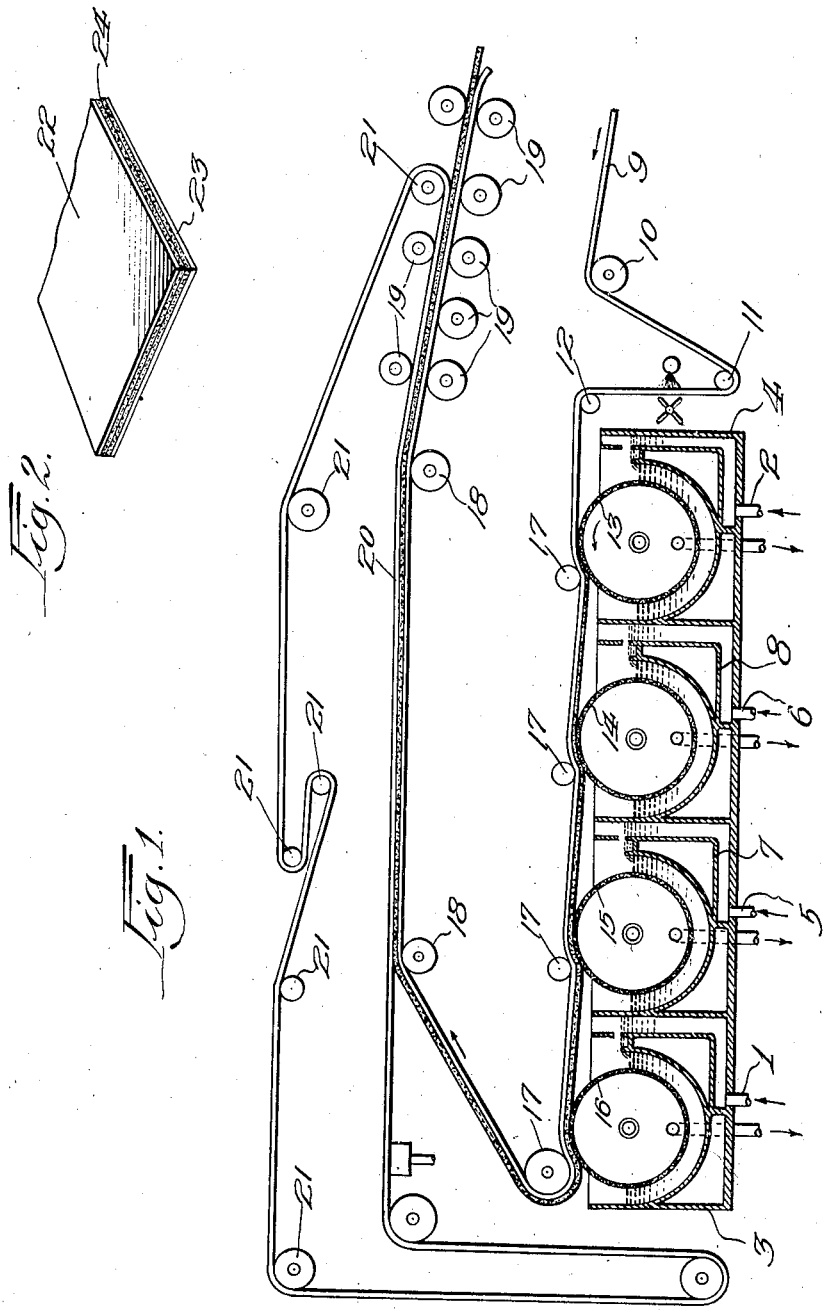

1,725,647

UNITED STATES PATENT OFFICE.

LESTER KIRSCHBRAUN, OF CHICAGO, ILLINOIS.

FELTED SHEET AND PROCESS OF MAKING SAME.

Application filed April 20, 1921. Serial No. 463,031.

This invention relates to improvements in a felted sheet and process of making same and refers more particularly to the formation of a multi-ply saturated sheet used in connection with roofing, building paper, flooring or other analogous industries.

Among the salient objects of the invention are to provide a sheet which is primarily formed with the inner plies or body of the sheet having a substantial amount of bituminous binder incorporated therewith during the felting or paper making operation; to provide a sheet or product whose strength is materially improved by the incorporation of this waterproof or pitchy binder and one which may be subjected to further saturation by passing it through a body of saturating substance; to provide a product whose central body plies consist of felted fibrous material impregnated with an asphaltic or bituminous binder and whose outer plies comprise relatively thin layers or plies of fibrous stock devoid of any binder substance; the outer plies being integrally united with the impregnated inner plies during the initial paper making operation; to provide a product which is capable of speed tank saturation due to its strength and also to the thinness of the portions which necessitate subsequent saturation; to provide a product which after the initial formation is water-resistant and does not tend, upon storage, to absorb excessive moisture which tends to retard subsequent saturation; to provide a product whose plies upon being subsequently passed through the saturating tank do not tend to separate or pull apart and one in which, due to the binder substance incorporated in the central plies unites the plies into a unitary sheet; to provide a product whose structure is better felted due to the superior formation of the multi-cylinder apparatus whereby a better strength may be obtained by the use of an inferior paper stock and one in which a stock not commonly adapted to tank saturation may be readily impregnated; to provide a process for producing this product and in general to provide an improved process and product of the character referred to.

Fig. 1 is a diagrammatic side elevational view of an apparatus which may be used to produce the multi-ply product.

Fig. 2 is a fragmentary perspective view showing a detail of the multi-ply sheet.

Referring more in detail to the drawings, the paper stock used to make the separate plies may be introduced from suitable beaters through the pipes 1 and 2 into the vats 3 and 4, which it is to be noted in the present instance, are illustrated as being the vats in which the outer plies are formed and which contain no emulsion.

Describing now the manner in which the adhesive substance may be introduced, an emulsion made, for instance, as described in detail in my United States Patent No. 1,302,810, may be mixed with fibrous stock in any suitable mixing apparatus and the entire mixture introduced through the pipes 5 and 6 to the vats 7 and 8, respectively.

With stock in the central vats 7 and 8 containing the waterproofing substance, and the end vats 3 and 4 devoid of any waterproofing material, the blanket 9 driven by any suitable source of power (not shown) and passing over the guide rolls 10, 11 and 12, there is released from the initial cylinder mold 13 in vat 4 the first ply of the sheet. In a like manner subsequent plies are taken off of the cylinder molds 14, 15 and 16, mounted respectively in vats 8, 7 and 3. The usual couch rolls 17 may be positioned above the respective cylinder molds, serving to hold the blanket against the mold. The sheet thus formed will have the two outer plies formed of a plain web of paper stock, while the inner plies contain the waterproofing material in emulsified form intimately incorporated with the fibers of the web.

This multi-ply sheet is carried by the blanket 9 over the guide rolls 18 and thence through the usual pressing rolls 19, after which the blanket is returned to again receive the plies, the multi-ply sheet after being pressed being led to drying rolls (not shown). The upper blanket 20 may be returned over guide rolls and stretcher rolls 21 by means of which a regulated tension may be maintained upon the blanket.

It is understood, of course, that the emulsion may be supplied to all of the vats, or that the plies containing the waterproofing substance may be arranged in any manner described other than that shown in the drawings.

In Fig. 2 the upper and lower plies shown at 22 and 23, respectively, are devoid of waterproofing substance, while two central plies 24 contain the waterproofing material, which, as explained, is introduced in emulsified form and permitted to coalesce during the drying operation, at which time it may be desirable to heat the sheet in order to cause the waterproofing substance to more thoroughly fuse with the fibres, spreading and coalescing with the plies to form a continuous waterproofing medium.

Heretofore roofing felts and fibrous sheets for tank saturation have been formed and produced upon a single cylinder machine for the reason that such sheets, if produced in plies upon a multi-cylinder machine, have a decided tendency, when subjected to asphalt tank saturation, to come apart. On this account, the use of a single cylinder machine in the formation of relatively thick felted sheets as for example, to .075 of an inch in thickness has limited the character of the stock which could be used to such a degree of freeness as would permit the building up of the desired thickness on one cylinder. As will be appreciated by those familiar with the art, the formation of such a stock on a single cylinder machine necessarily results in a sheet which is relatively rough and in which the full strength of the fibres cannot be completely developed. On this account, stocks which are used for the purpose of making roofing or flooring felts have been limited largely to rags in combination with various rag fibres and minor percentages of cheaper stocks.

By the process of the present invention, it has been found possible through incorporating predetermined amounts of asphalt or bituminous binder in emulsified form into the sheet to produce a product in which the plies are so firmly arranged and the moisture content of the inner plies so reduced that the tendency to separation of the plies in the hot saturating bath is entirely eliminated. This has made it possible to utilize the multi-cylinder machine for the purpose of producing roofing and flooring felts by tank saturation in the manner which will be hereinafter described. In addition, the use of the multicylinder machine makes it possible to use the stocks which have heretofore been incapable of use upon the single cylinder machine and to produce felted sheets of such a quality and of such a character as to permit of substantial economies in the stock used and rapid saturation and production in the subsequent tank saturating operation.

The essence of this invention consists in introducing and mixing with the stock used in the inner cylinders of the multi-cylinder machine, asphalt binder in the form of a non-adhesive emulsion with water and clay which has the effect of presaturating these inner plies and integrally and firmly uniting them to the outer plies leaving the relatively thin surface to be saturated in the subsequent operation.

The paper machine used for this purpose is the well known multi-cylinder machine of commerce which is employed for making relatively heavy sheets of slow or hard stock, such as box board, chipboard and various fibrous container boards known to the art. For the purpose of the present invention, the multi-cylinder machine should comprise at least three forming cylinders and preferably five to seven cylinders may be employed to better advantage.

The asphalt used may be any of the commercial varieties such as natural asphalt or the residual product from petroleum reduced to a solid or semi-solid form; or the binder, instead of being of an asphaltic nature may be of pitchy character such as coal tar or water gas pitch, vegetable and animal pitches and analogous fusible waterproofing pitches, whether strictly of a bituminous nature or not. These waterproofing pitches have a melting point of say, upwards of 100 degrees F., and while being of a more or less solid character, have properties of slowly flowing at normal temperatures and of being adhesive when contacted with other substances. In order to use the pitches or bituminous materials described, it is necessary to convert them to a non-adhesive state, which is accomplished by a process of emulsification whereby the pitches in hot liquid condition are emulsified with colloidal clay or other suitable emulsifying agent in aqueous suspension in such manner that the aqueous liquid constitutes the continuous phase while the pitch constitutes the dispersed phase.

An exceedingly fine degree of dispersion is required in order to convert the pitches described into the non-adhesive form and it is also essential that the colloidal clay present be so adsorbed on the particles and retained as to provide a protective element against coalescence under the pressure of contact surfaces such as blankets, wires, etc., on the paper machine. The degree of dispersion necessary will vary from that approaching colloidal particles in size to an emulsion so constituted that only about 1% of the particles will be retained on a screen having 40,000 openings per square inch. In practical operation, all of the emulsion in liquid form is screened through 40 or 60 mesh screen, the small amount retained being rejected as unemulsified, in comminuted form, and incapable of use on the machine without adhering to the parts thereof.

The bituminous emulsion so produced is thinned with water to a consistency by which it can be handled readily by pumps and may be mixed with fibrous stocks either in the beater engines or at the mix box prior to reaching the screens of the multi-cylinder machine. Where separate systems are available for liner and filler, it is preferable to mix the asphalt with the fibrous stock in the beaters but where a single system only is available, it is necessary to mix the asphalt at the screens as described. The asphalt emulsion when mixed with the fibrous stock is preferably "fixed", which is accomplished by the addition of silicate of soda to the mixture in the beaters followed by treatment with alum; or if set outside of the beaters, the emulsion itself is treated with silicate of soda and alum prior to its mixture with the fibrous stock. These fixing agents have the property of causing the dispersed asphalt to seek contact with the fibrous stock and be advantageously carried thereby and lessen the tendency to pass through the sheet or adhere to the parts of the machine.

The formation of the sheet and the manipulation of the stock on the machine is carried out in the usual manner without any interference whatsoever with the customary procedure of making the paper. The asphalt is preferably incorporated into the stock which forms all of the inner plies, leaving a relatively thin outer ply on both sides of the sheet devoid of the bituminous material. For example, on a five-cylinder machine, a 50-point felt may be made which will carry .014 on each of the three inner cylinders and .004 on the remaining two outer cylinders.

Upon reaching the driers, the wet web is subjected to a temperature above the melting point of the asphalt or bituminous material, and with the removal of the water, the dispersed asphalt gradually coalesces, in effect flowing through the inner plies, coating the fibres thereof, and firmly uniting them together and adhesively binding the inner plies with the outer plies without actually saturating through the outer plies. The amount of asphalt used can be varied, depending on the result to be achieved and the character of the stock to be used. For example, if it is merely desired to cement the plies together so as to preclude separation in the tank, a relatively small amount of asphalt will serve this purpose such as 20%. However, on the other hand, where in addition to maintaining the plies, it is desired to accelerate tank saturation, the amount of asphalt to be incorporated should be suitably in excess and preferably should reach 100% or more in relation to the fibrous stock. Likewise, where the fibrous stock is of a refractory character to tank saturation, it is desirable to incorporate the maximum amount of asphalt so that the tank saturating operation may be facilitated to the greatest possible extent.

Stocks used for this purpose can be varied to produce a sheet comprising all rags, but preferably a large content of cheap stock such as news or mixed papers can be incorporated and yet produce a sheet which is capable of rapid tank saturation. As is well known, the use of relatively hard stock tends to produce strength and the addition of the asphalt likewise has a substantial effect in strengthening the sheet, this strengthening generally resulting in an increment of about 100% of the raw fibrous strength of the stock.

I have found that a mixture of 50% rags and 50% of mixed papers makes a very desirable sheet, say, for a 40 to 50 caliper product, the resulting sheet having flexibility, strength and drag in the fibres. For thinner sheets, a stock comprising 80% of news and 20% rags serves excellently to produce a desirable product for subsequent saturation where the inner plies are presaturated to the extent explained above. In certain cases, no rags at all are needed and the entire furnish may be composed of the cheap paper stocks, the character of the sheet being such that the resulting tank saturation takes place with sufficient ease and results in the sheet having the desired flexibility and other qualities required for high grade roofing products.

It will also be understood that where the machine is equipped with separate systems so that various stocks can be used on liner and filler, the inner plies may advantageously be composed of all paper, presaturated and the outer plies may carry either a strength-giving stock such as kraft or long fibre stock such as rags, which gives the desired flexibility, drag and tank saturating properties.

It will be understood in connection with this subsequent saturation that the rapidity with which this operation can be carried out, depends upon the thickness of the outer plies, the amount of presaturation carried in the inner plies, the absence of moisture in the sheet (which retards tank saturation) and the strength of the sheet which enables it to withstand the heavy tensions necessitated by the speed and rapid travel of the sheet during the subsequent operation. The effect of moisture as a retardent of saturation is well known to those skilled in the art, it being understood that the dry roofing felt of commerce acquires between 5% to 10% of moisture, which moisture must be converted into steam and driven from the sheet prior to the entrance of the hot asphalt into the sheet. It is estimated that practically two thirds of the distance travelled by the sheet in the saturating tank is occupied by a removal of the moisture prior to the entry of the asphalt, and to this extent, the retardation of the saturation is affected by the moisture.

An interesting characteristic of this product may further be noted in that it is practically impossible to separate the various plies after the sheet is dry. As is well known to those familiar with the product of multi-cylinder machines, a more or less distinct division can be noted in products of this character which makes it possible by tearing the sheet to distinguish the separate webs, particularly if these be slightly moistened. This characteristic is absent in the product of the present invention, apparently through the additional bonding effect of the asphalt upon its coalescence. This may be influenced by the slight infiltration of the asphalt when the wet plies containing asphalt are united with those free from asphalt as they pass under the couch rolls. This results in a sheet in which the plies cannot be pulled apart even when wet and the only way in which the thickness of the inner plies can be determined is by wetting the outer plies and actually abrading away the unsaturated stock until the resistance of the inner and saturated portions precludes further separation.

An illustrative run of this process is as follows: Mexican asphalt of about 150 melting point was converted into non-adhesive form by the emulsifying operation outlined above, the proportion of asphalt to clay being about four to one. To the emulsion thus produced was added silicate of soda and aluminum sulphate to the extent of 2% of the former and 5% of the latter. The stock used throughout the sheet was the same and comprised 50% of mixed papers, 25% of dark cottons and 25% of tailor's muss. This stock was beaten up in the presence of ½ of 1% of caustic soda which was subsequently neutralized with 2% aluminum sulphate. The sheet was formed on a multi-cylinder machine in the usual manner, the asphalt being mixed with the stock as previously described for the two inner plies, the two outer plies remaining blank. This sheet was run to 35 caliper and gave a Mullen strength of 60. The content of asphalt in the two inner plies was about 70% of the fibre content of these plies. The paper so produced was then subjected to the usual tank saturating operation, passing through a tank containing the Mexican asphalt of 110 degrees melting point at approximately 400 degrees F. On account of the great strength of this material, its dryness and its presaturation, it was possible to pass this through the saturating and coating rollers on a standard roofing machine at the rate of 200 feet a minute, whereas the maximum speed at which the ordinary roofing felt of commerce travels during this operation is 105 feet per minute. The resulting saturated sheet was coated after passing through the saturating tanks and made into roofing in the usual manner, the product being a flexible, well-saturated roofing product containing 140% of asphalt relative to the fibre content of the entire sheet. This specific example is given only as an indication of the possibilities of the process.

An invention as above described may be carried out in which the product, instead of being saturated with bitumen may be passed through baths of aqueous liquid such as glue, casein, zinc chloride, and numerous other liquids such as sulphuric acid, glycerine and particularly those which would ordinarily have a deteriorating and weakening effect through the wetting of the fibres. By the presence of the inner waterproof plies, the fibres are protected from wetting and only the outer plies become capable of being acted on by the saturating liquid.

I claim as my invention:

1. A multi-ply sheet of felted fibrous plies comprising an inner ply or plies of fibrous stock and fusible water proof binder completely disseminated thruout the plies in the form of a continuous film coating the fibers, outer plies substantially devoid of such binder intimately united to the inner ply or plies, the whole having the characteristics of having had the binder incorporated while dispersed in an aqueous medium and having been rendered sufficiently fluid to coat the fibers of the inner ply or plies.

2. A multi-ply sheet having an inner ply or plies of bitumen coated fibrous stock and outer plies substantially devoid of bitumen, having the characteristics of a sheet produced by the simultaneous formation of fibrous webs, said bitumen extending thruout the inner ply or plies in the form of a continuous film coating the fibers.

3. A process of producing a multi-ply sheet consisting in forming a plurality of webs of fibrous stock on a multi-cylinder machine, incorporating into the stock forming inner ply or plies a bitumen emulsified while in a liquid condition and combined therewith while in a non-adhesive state, uniting the plies while wet and simultaneously drying the sheet and coalescing the bitumen.

4. A process of producing a multi-ply sheet consisting in forming a plurality of webs of fibrous stock on a multi-cylinder machine, incorporating into the stock forming the inner plies emulsified bitumen in non-adhesive state, uniting the plies while wet and simultaneously drying the sheet and coalescing the bitumen.

5. A process of producing a multi-ply sheet consisting in forming a plurality of webs of fibrous stock on a multi-cylinder machine, incorporating into the stock forming the inner ply emulsified bitumen in non-adhesive state, uniting the plies while wet and simultaneously drying the sheet and coalescing the bitumen, and subsequently passing the sheet through a saturating liquid.

6. A felted fibrous sheet, being interiorly impregnated with a liquid repellant medium, both surfaces of said sheet comprising fibrous stock substantially devoid of liquid repellant medium, having the characteristics of having had the liquid repellant medium incorporated while in emulsified condition.

LESTER KIRSCHBRAUN.